(12) United States Patent
Kohchi (10) Patent No.: US 6,731,896 B2
(45) Date of Patent: May 4, 2004

(54) IMAGE-READING DEVICE HAVING A CONTACT PREVENTION MEMBER PREVENTING A LAMP HARNESS FROM CONTACTING OTHER ELEMENTS

(75) Inventor: Masashi Kohchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/183,404

(22) Filed: Jun. 28, 2002

(65) Prior Publication Data

US 2003/0002889 A1 Jan. 2, 2003

(30) Foreign Application Priority Data

Jun. 29, 2001 (JP) ......................... 2001-198053

(51) Int. Cl.[7] ................. G03G 15/30; H02G 11/00; H04N 1/04
(52) U.S. Cl. .......................... 399/211; 399/88
(58) Field of Search ................ 399/211, 88, 220

(56) References Cited

U.S. PATENT DOCUMENTS 6,549,743 B2 * 4/2003 Takahashi et al. .......... 399/211

2002/0114645 A1 * 8/2002 Takahashi et al. .......... 399/211

FOREIGN PATENT DOCUMENTS

| JP | 8-195860 | 7/1996 |
| JP | 2000-299769 | 10/2000 |
| JP | 2001-136325 | 5/2001 |

* cited by examiner

Primary Examiner—Quana M. Grainger
(74) Attorney, Agent, or Firm—Oblon, Spivak, McClelland, Maier & Neustadt, P.C.

(57) ABSTRACT

An image-reading device exposes and scans an image of a subject copy by reciprocating a first traveler including an exposure lamp and a mirror, and a second traveler including two mirrors, along a sub scanning direction at a velocity ratio of 2:1. The image-reading device comprises a harness, a flexible cable, and a contact prevention member. The harness supplies power to the exposure lamp. The flexible cable has one end connected to the harness and the other end connected to a power source. The contact prevention member is provided on the first traveler so as to prevent the harness from contacting the second traveler and the mirrors included in the second traveler.

14 Claims, 5 Drawing Sheets

IMAGE-READING DEVICE HAVING A CONTACT PREVENTION MEMBER PREVENTING A LAMP HARNESS FROM CONTACTING OTHER ELEMENTS

BACKGROUND OF THE INVENTION

1. Field of the Invention

The present invention generally relates to an image-reading device, an image-forming device, and a copying machine, and more particularly, to an image-reading device which exposes and scans an image of a subject copy by moving two travelers including an exposure lamp and mirrors at different velocities.

2. Description of the Related Art

Conventionally, there has been an image-reading device that exposes and scans an image of a subject copy placed on a contact glass by causing a stepping motor to drive a first traveler including an exposure lamp and a mirror, and a second traveler including two mirrors, along a sub (slow) scanning direction at a velocity ratio of 2:1.

Generally, in the image-reading device that causes the stepping motor to drive the first traveler and the second traveler, a driving velocity of the stepping motor is controlled to change gradually, because of structural requirements. Additionally, another type of image-reading device causing the stepping motor to drive the first traveler and the second traveler reads an image of a subject copy within a range where the driving velocity of the stepping motor is constant, because of an easier control required therefor and a quality of the read image achieved therefrom.

Such an image-reading device as mentioned above requires a dimension in the sub scanning direction to be equal to or larger than a total dimension of a dimension in the sub scanning direction of an image of a subject copy and a dimension in the sub scanning direction required for a run-up and a slowdown of the first traveler and the second traveler. In other words, the dimension of the image-reading device in the sub scanning direction can be theoretically decreased to equal the above-mentioned total dimension.

Additionally, for the purpose of miniaturization, there is still another image-reading device in which the first traveler and the second traveler are arranged close to each other in the course of traveling, or are arranged close to each other by being overlapped at a home position.

By the way, the above-mentioned exposure lamp is provided with a lamp harness used for supplying power to the exposure lamp. This lamp harness is connected to one end of a flexible cable the other end of which is connected to a power source. In some image-reading devices, this flexible cable is drawn around a travel-back side of the second traveler (i.e., a side toward which the second traveler travels back), because it becomes easy to assemble the image-reading device, or it becomes easy to draw around the flexible cable.

For the purpose of miniaturizing the image-reading device, it is preferred that the flexible cable be drawn around the travel-back side of the second traveler as closely as possible. However, when the flexible cable is positioned close directly to the second traveler, the flexible cable contacts the mirrors and other elements mounted on the second traveler. Moving the first traveler and the second traveler back and forth repeatedly with the flexible cable contacting the mirrors and other elements mounted on the second traveler may possibly cause the flexible cable and the mirrors to rub on each other so that a friction thereof damages the flexible cable.

To prevent this damage, a conventional image-reading device comprises a cable guide mounted on the second traveler such that a guide surface guiding the flexible cable is positioned between the mirrors and the flexible cable. This arrangement prevents the flexible cable and the mirrors from rubbing on each other, and thus prevents the flexible cable from being damaged therefrom. The cable guide is provided with guide ribs raised from both sides of the guide surface past the flexible cable. These guide ribs position the flexible cable on the guide surface, and prevent the flexible cable from shifting with respect to the guide surface.

By the way, in some cases, the lamp harness is connected to the flexible cable in a state where the lamp harness is deformed toward the second traveler due to a varying precision in assembling the image-reading device.

In the above-described image-reading device including the first traveler and the second traveler arranged close to each other for the purpose of miniaturization, when the first traveler and the second traveler are moved back and forth in the above-mentioned state where the lamp harness is deformed toward the second traveler, the lamp harness is more likely to contact the second traveler or the mirrors mounted on the second traveler. Since the first traveler and the second traveler are reciprocated at different velocities, moving the first traveler and the second traveler back and forth repeatedly may cause the lamp harness to be rubbed by the second traveler or the mirrors mounted on the second traveler, which may result in a fatigue breakage of the lamp harness.

Also, in the above-described image-reading device comprising the cable guide, the guide ribs are raised from both sides of the guide surface past the flexible cable. Therefore, when the first traveler and the second traveler are arranged close to each other for the purpose of miniaturization, the lamp harness deformed toward the second traveler is more likely to contact the guide ribs. Moving the first traveler and the second traveler back and forth repeatedly with the lamp harness contacting the guide ribs may result in a fatigue breakage of the lamp harness.

The fatigue breakage of the lamp harness results in a heteropolar leak involving a voltage difference between the damaged lamp harness and the flexible cable.

As a conceivable countermeasure thereagainst, the assembly of the image-reading device may be performed so that the lamp harness be provided at a prescribed position in consideration of various factors, such as a particular tendency of the lamp harness for bending. However, assembling the image-reading device in consideration of the various bending tendency of the lamp harness takes time so as to reduce a productivity of the assembly, which does not suit a mass production of the image-reading device.

SUMMARY OF THE INVENTION

It is a general object of the present invention to provide an improved and useful image-reading device and a copying machine in which the above-mentioned problems are eliminated.

A more specific object of the present invention is to provide an image-reading device, and a copying machine using the image-reading device which can be miniaturized by having a first traveler and a second traveler arranged close to each other without damaging a harness, regardless of a varying precision in an assembly thereof.

In order to achieve the above-mentioned objects, there is provided according to one aspect of the present invention an image-reading device exposing and scanning an image of a subject copy by reciprocating a first traveler including an exposure lamp and a mirror, and a second traveler including two mirrors, along a sub scanning direction at a velocity ratio of 2:1, the image-reading device comprising a harness supplying power to the exposure lamp, a flexible cable having one end connected to the harness and the other end connected to a power source, and a contact prevention member provided on the first traveler so as to prevent the harness from contacting the second traveler and the mirrors included in the second traveler.

According to the present invention, the contact prevention member prevents the harness from contacting the second traveler and the mirrors included in the second traveler. Accordingly, for example, when the first traveler and the second traveler are arranged close to each other for the purpose of miniaturizing the image-reading device, the harness can be prevented from rubbing on the second traveler and the mirrors included in the second traveler and thus from being damaged thereby which would otherwise occur due to a difference between the velocities of the first traveler and the second traveler traveling back and forth. In addition, since the contact prevention member is provided on the first traveler, the contact prevention member moves together with the harness in the course of exposing and scanning an image of a subject copy. Thereby, the harness and the contact prevention member can be prevented from rubbing on each other.

Additionally, the image-reading device according to the present invention may further comprise a cable guide provided on the second traveler so as to guide the flexible cable to a side toward which the second traveler travels back, wherein the contact prevention member prevents the harness from contacting the cable guide.

According to the present invention, the contact prevention member prevents the harness from contacting the cable guide. Accordingly, when the cable guide is provided on the second traveler so as to draw the flexible cable closely around the second traveler, the harness can be prevented from rubbing on the cable guide and thus from being damaged thereby which would otherwise occur due to the difference between the velocities of the first traveler and the second traveler traveling back and forth.

Additionally, the image-reading device according to the present invention may further comprise a plate-form reinforcing member bonded to the flexible cable so that the harness and the flexible cable are connected to each other with the reinforcing member therebetween, wherein the contact prevention member is a plate-form member formed unitarily with the reinforcing member.

At this point, upon soldering wires, a reinforcing plate, for example, may sometimes be used to flatten a part at which the wires are connected, and to flatten a periphery thereof. Thus, when the harness and the flexible cable are connected by soldering, the plate-form reinforcing member according to the present invention becomes necessary for flattening a part at which the harness and the flexible cable are connected, and for flattening a periphery thereof. Additionally, the contact prevention member is provided as a plate-form member formed unitarily with the plate-form reinforcing member so as to reduce the number of elements composing the image-reading device and to decrease the number of steps required for assembling the image-reading device.

Additionally, the image-reading device according to the present invention may further comprise a first connector provided at an end of the harness, and a second connector provided at the one end of the flexible cable so that the first connector is detachably inserted into the second connector, wherein the first connector can be inserted into and detached from the second connector at a side of the second connector opposite the one end of the flexible cable.

According to the present invention, the harness and the flexible cable are led out in an identical direction from a position at which the first connector is inserted into the second connector. Therefore, when the above-mentioned one end of the flexible cable is positioned nearer to the exposure lamp, connecting the harness to the flexible cable by inserting the first connector into the second connector enables the flexible cable to be drawn from the position nearer to the exposure lamp around the second traveler. Accordingly, the first traveler and the second traveler can be arranged closer to each other so as to further miniaturize the image-reading device.

Additionally, in the image-reading device according to the present invention, at least a part of the harness may be fixed to the contact prevention member.

According to the present invention, the harness can be positioned at a periphery of the contact prevention member. Thereby, the harness can be prevented from departing from the contact prevention member into a friction against neighboring elements; thus, the harness can be prevented from being damaged.

Additionally, the image-reading device according to the present invention may further comprise a restricting member provided on a surface of the contact prevention member opposite the flexible cable so as to restrict the harness on the surface of the contact prevention member.

According to the present invention, the harness is restricted to the contact prevention member by the restricting member such that the harness is positioned opposite the flexible cable with the contact prevention member therebetween. Thereby, the harness and the flexible cable can be surely prevented from contacting each other.

In order to achieve the above-mentioned objects, there is also provided according to another aspect of the present invention a copying machine comprising the above-mentioned image-reading device, and an image-forming device forming the image of the subject copy read by the image-reading device on a sheet.

According to the present invention, the copying machine can provide the same advantages as the above-mentioned image-reading device.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to FIG. 1 to FIG. 5B, of a first embodiment according to the present invention. The present embodiment is an example of applying the present invention to an image scanner of a flatbed type as an image-reading device.

Figure 1:
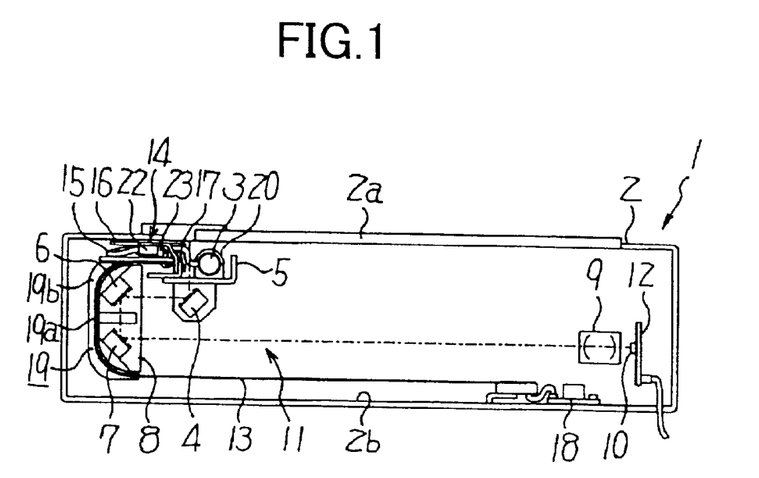
FIG. 1 is a vertical-sectional side view of a main structure of an image scanner according to a first embodiment of the present invention.

FIG. 1 is a vertical-sectional side view of a main structure of an image scanner 1 according to the present first embodiment. As shown in FIG. 1, a contact glass 2a is provided on an upper surface of a scanner housing 2 of the scanner 1. A subject copy is to be placed on the contact glass 2a.

Also as shown in FIG. 1, an exposure optical system 11 is provided in the scanner housing 2. The exposure optical system 11 comprises a first traveler 5, a second traveler 8, a lens 9 and a photoreceptive sensor 10. An exposure lamp 3 and a mirror 4 are mounted on the first traveler 5. Two mirrors 6 and 7 are mounted on the second traveler 8. Each of the exposure lamp 3 and the mirrors 4, 6 and 7 is arranged longitudinally in a main (fast) scanning direction. The photoreceptive sensor 10 is mounted on a sensor board 12.

An end of a flexible printed circuit board (hereinafter referred to as FPC) 13 is connected to the first traveler 5. The FPC 13 functions as a flexible cable having a long form consisting of two conductive cables and an insulating film coating an outer periphery of the two conductive cables. A lamp harness 15 is connected via a connector unit 14 to the above-mentioned end of the FPC 13 connected to the first traveler 5. The lamp harness 15 functions as a harness used for supplying power to the exposure lamp 3.

The connector unit 14 is held by a connector holder 16 provided on the first traveler 5. Flexibly transformable hooks 16a (shown in FIG. 3) are formed unitarily on the connector holder 16. The connector holder 16 is supported by a supporter 17 mounted on the first traveler 5 by the hooks 16a being locked into respective holes 17a (shown in FIG. 3) formed in the supporter 17.

The FPC 13 is drawn around a travel-back side of the second traveler 8 (at the left side of the second traveler 8 in FIG. 1), and the other end of the FPC 13 opposite the connector unit 14 is connected to an inverter 18 provided as a power source on a bottom surface 2b of the scanner housing 2.

Figure 2:
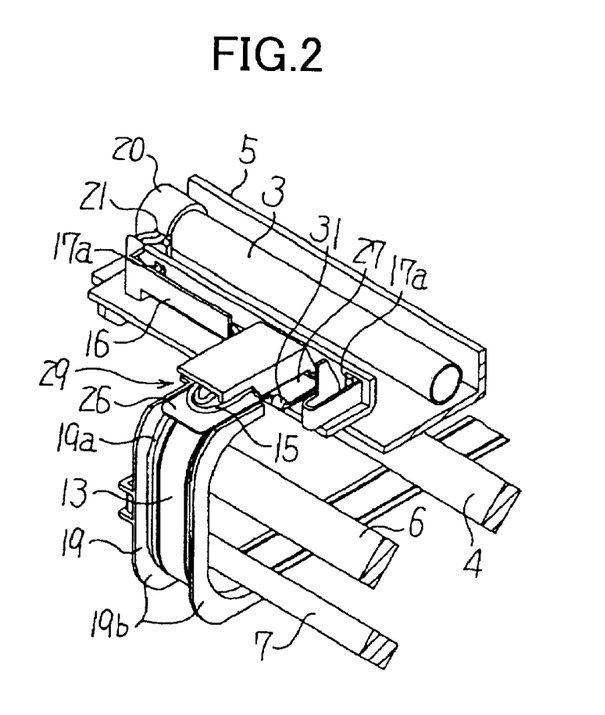
FIG. 2 is a magnified perspective view in the vicinity of a first traveler shown in FIG. 1.

An FPC guide 19 is provided as a cable guide at a part of the second traveler 8 around which the FPC 13 is drawn. The FPC guide 19 is provided so as to guide the FPC 13 to a predetermined path. As shown in FIG. 2, the FPC guide 19 comprises a guide surface 19a and guide ribs 19b. The guide surface 19a is so curved as to cover the mirrors 6 and 7. The guide ribs 19b are provided at both ends of the guide surface 19a in the main scanning direction such that the guide ribs 19b are raised from the guide surface 19a past the FPC 13. Thereby, the FPC 13 can be prevented from shifting in the main scanning direction with respect to the guide surface 19a.

Figure 3:
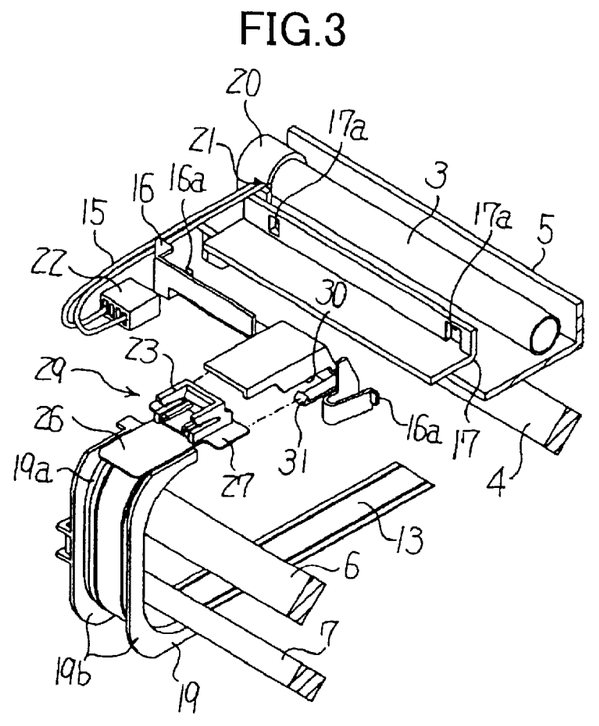
FIG. 3 is an exploded perspective view in the vicinity of the first traveler shown in FIG. 2.
Figure 4:
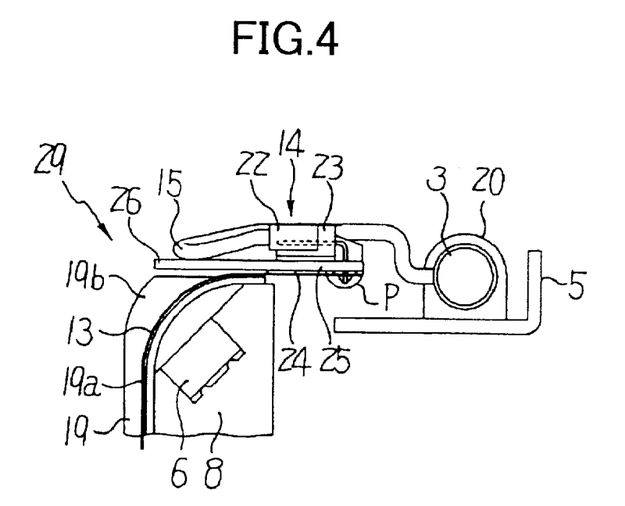
FIG. 4 is a vertical-sectional side view in the vicinity of the first traveler shown in FIG. 2.

A more detailed description will be given, with reference to FIG. 2 to FIG. 4, mainly of the first traveler 5. FIG. 2 is a magnified perspective view in the vicinity of the first traveler 5. FIG. 3 is an exploded perspective view thereof. FIG. 4 is a vertical-sectional side view in the vicinity of the first traveler 5. The exposure lamp 3 is held at both ends by a pair of lamp holders 20 provided on the first traveler 5. A notched portion 21 is formed in one of the lamp holders 20 so that the notched portion 21 guides the lamp harness 15 of the exposure lamp 3. A convex-form connector 22 is provided as a first connector at an end of the lamp harness 15 guided out from the notched portion 21.

A concave-form connector 23 is provided as a second connector on the connector holder 16 mounted on the first traveler 5 with the supporter 17 therebetween. The convex-form connector 22 of the lamp harness 15 is inserted into the concave-form connector 23. The FPC 13 is connected to the concave-form connector 23 at a travel-forth side opposite the above-mentioned travel-back side (i.e., at the right side of the concave-form connector 23 in FIG. 4) by soldering.

The convex-form connector 22 can be inserted into and detached from the travel-back side of the concave-form connector 23 (at the left side of the concave-form connector 23 in FIG. 4). Accordingly, the lamp harness 15 is led out from the convex-form connector 22 in the same direction as the FPC 13 is led out from the concave-form connector 23 at the above-mentioned travel-back side of the connector unit 14 (at the left side of the connector unit 14 in FIG. 4). The lamp harness 15 and the FPC 13 are led out in the same direction with respect to the connector unit 14 so that an end surface of the connector unit 14 at the travel-forth side (i.e., at the right side of the connector unit 14 in FIG. 4) can be positioned nearer to the exposure lamp 3.

Figure 5A:
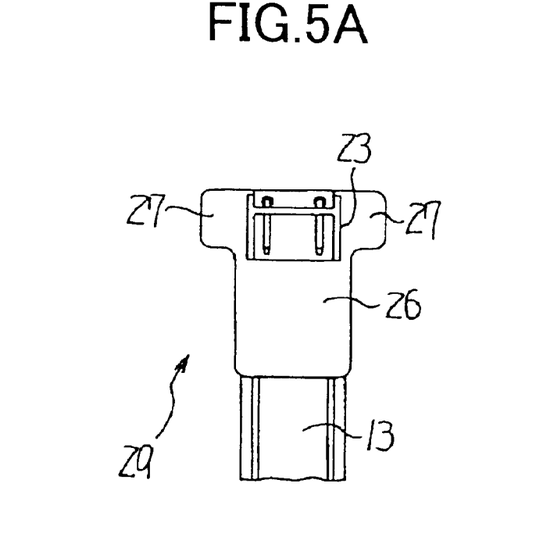
FIG. 5A is a top view of a cable unit shown in FIG. 2 to FIG. 4.
Figure 5B:
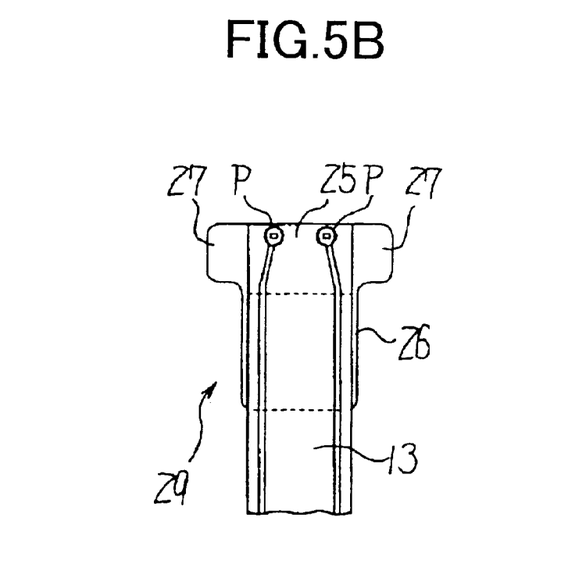
FIG. 5B is a bottom view of the cable unit shown in FIG. 5A.

As shown in FIG. 4, FIG. 5A and FIG. 5B, a flat reinforcing plate 25 is bonded to the end of the FPC 13 with an adhesive 24. The concave-form connector 23 is bonded to the FPC 13 with the reinforcing plate 25 therebetween. The reinforcing plate 25 is provided so that the FPC 13 is bonded to the concave-form connector 23 on a flat surface. Thereby, the FPC 13 can be connected to the concave-form connector 23 favorably by soldering. The adhesive 24 is applied to a minimum range necessary for the FPC 13 to be bonded to the reinforcing plate 25. Accordingly, the FPC 13 can be bent without being unnecessarily restricted by the reinforcing plate 25. Thus, the FPC 13 can be bent at a position nearer to the exposure lamp 3.

In addition, a coating of resin P is applied, for example by a hot-melt process, to a connection part at which the FPC 13 is connected to the concave-form connector 23 by soldering. The coating of resin P is applied so as to prevent electricity from leaking from the connection part.

A harness guide 26 having a flat-plate form is provided as a contact prevention member so that the harness guide 26 extends horizontally from the reinforcing plate 25 toward the second traveler 8 along a sub (slow) scanning direction. In the present embodiment, the reinforcing plate 25 and the harness guide 26 are formed unitarily of a single plate material. Although the reinforcing plate 25 and the harness guide 26 are formed unitarily, the adhesive 24 is applied only to a part corresponding to the reinforcing plate 25, as shown in FIG. 4. Accordingly, even when the reinforcing plate 25 and the harness guide 26 are formed unitarily, the FPC 13 is bonded with the part corresponding to the reinforcing plate 25.

In addition, mounting grip pieces 27 are provided at both ends of the reinforcing plate 25 in the main scanning direction. In the present embodiment, the reinforcing plate 25 and the mounting grip pieces 27 are formed unitarily of a single plate material. The concave-form connector 23, the FPC 13, the reinforcing plate 25, the harness guide 26 and the mounting grip pieces 27 compose a cable unit 29.

Slits 30 are formed in the connector holder 16, as shown in FIG. 3. Each of the slits 30 has a width equivalent to a thickness of the mounting grip piece 27. The slit 30 is elastically transformable due to an elasticity of a material forming the connector holder 16 so that the slit 30 opens wide. A projection 31 is provided at an entrance to each of the slits 30. The projection 31 is so projected as to block the entrance to each of the slits 30.

Upon mounting the above-mentioned cable unit 29, each of the slits 30 is elastically transformed so that the slit 30 opens wide. Then, each of the mounting grip pieces 27 is inserted into the opened slit 30. After the insertion of the mounting grip piece 27, the slit 30 returns to a closing state by the elasticity thereof. Thus, the cable unit 29 can be mounted with ease. Additionally, each of the mounting grip pieces 27 is prevented from jouncing in the slit 30 by the projection 31 provided at the entrance to the slit 30. Accordingly, the cable unit 29 can be surely fixed at a mounting position. The convex-form connector 22 of the lamp harness 15 is inserted into the concave-form connector 23 in the state where the cable unit 29 is fixed to the first traveler 5. This enables the exposure lamp 3 to be supplied with power.

As described above, the end of the FPC 13 is bonded to the reinforcing plate 25 with the adhesive 24. Therefore, in the state where the cable unit 29 is fixed to the first traveler 5, the FPC 13 bends downward from a boundary part between a part at which the FPC 13 is bonded to the reinforcing plate 25 and a part at which the FPC 13 is not bonded to the reinforcing plate 25, and the FPC 13 is guided toward a backside of a reflective surface of each of the two mirrors 6 and 7 mounted on the second traveler 8.

Additionally, in the FPC guide 19 according to the present embodiment, a part of one of the guide ribs 19b located outside in the main scanning direction which overlaps the lamp harness 15 in terms of a vertical position is exsected so that the guide rib 19b has a part in the same plane as an upper part of the guide surface 19a.

Upon reading an image of a subject copy, the image scanner 1 structured as above exposes and scans the image of the subject copy by moving the first traveler 5 and the second traveler 8 along the sub scanning direction at a velocity ratio of 2:1, and lighting the exposure lamp 3 while the first traveler 5 and the second traveler 8 travel at respective constant velocities. A light reflected from the image of the subject copy is converged as an incident light into the photoreceptive sensor 10 via the mirrors 4, 6 and 7 and the lens 9. The photoreceptive sensor 10 converts the incident light photoelectrically so as to output an image signal.

Supposedly in a conventional image scanner, the lamp harness 15 would be connected to the FPC 13 in a state where the lamp harness 15 is deformed toward the second traveler 8 due to a varying precision in assembling the image scanner.

In the image scanner including the first traveler 5 and the second traveler 8 arranged close to each other for the purpose of miniaturization, when the first traveler 5 and the second traveler 8 are moved back and forth in the above-mentioned state where the lamp harness 15 is deformed toward the second traveler 8, the lamp harness 15 would contact the guide ribs 19b of the FPC guide 19 and other elements.

At this point, since the first traveler 5 and the second traveler 8 are reciprocated at different velocities, moving the first traveler 5 and the second traveler 8 back and forth repeatedly would cause the lamp harness 15 to undergo a fatigue breakage due to a friction between the lamp harness 15 and the guide ribs 19b.

The fatigue breakage of the lamp harness 15 would result in a heteropolar leak involving a voltage difference between the damaged lamp harness 15 and the FPC 13.

As a countermeasure thereagainst, the assembly of the image scanner might be performed so that the lamp harness 15 would be provided at a prescribed position in consideration of various factors, such as a particular tendency of the lamp harness 15 for bending. Actually, however, assembling the image scanner in consideration of the various bending tendency of the lamp harness 15 would take time so as to reduce a productivity of the assembly, which would not suit a mass production of the image scanner.

In the present embodiment, the harness guide 26 prevents the lamp harness 15 from contacting the FPC guide 19, the second traveler 8 and the mirror 6.

Thereby, even when the first traveler 5 and the second traveler 8 are arranged close to each other for the purpose of miniaturizing the image scanner 1, the lamp harness 15 can be prevented from being damaged due to frictions against the FPC guide 19, the second traveler 8 and the mirror 6 caused by a difference between the velocities of the first traveler 5 and the second traveler 8 traveling back and forth.

At this point, since the harness guide 26 is provided on the first traveler 5, the harness guide 26 moves together with the lamp harness 15 when the first traveler 5 and the second traveler 8 travel back and forth. Accordingly, the lamp harness 15 can be prevented from rubbing on the harness guide 26, and thus can be prevented from being damaged therefrom.

According to the present embodiment, not only the image scanner 1 can be further miniaturized by drawing the FPC 13 closely around the second traveler 8, but also the heteropolar leak involving a voltage difference between the damaged lamp harness 15 and the FPC 13 can be prevented from occurring due to a damage of the lamp harness 15, regardless of a varying precision in assembling the image scanner 1.

Thus, upon assembling the image scanner 1, an assembler can assemble the image scanner 1 without paying particular attention to various factors, such as a bending tendency, of the lamp harness 15. Therefore, the image scanner 1 can be assembled more effectively.

Additionally, in the present embodiment, since a part of one of the guide ribs 19b of the FPC guide 19 is exsected so that the guide rib 19b has a part in the same plane as the upper part of the guide surface 19a, the lamp harness 15 can be more effectively prevented from being damaged due to a friction against the FPC guide 19.

Figure 6:
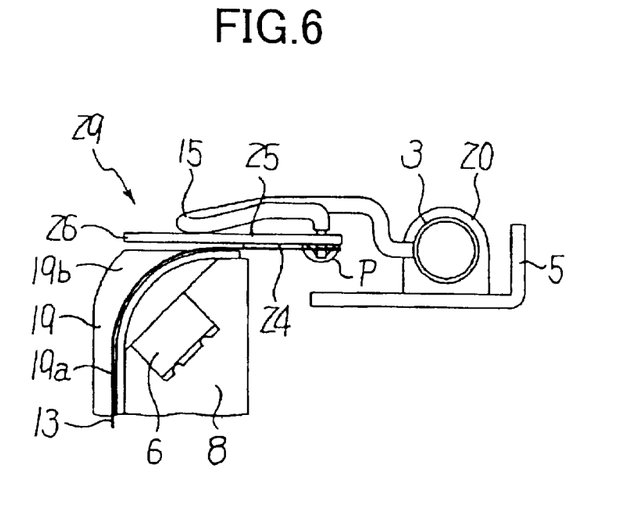
FIG. 6 is a vertical-sectional side view in the vicinity of the first traveler according to a variation of the present embodiment.

Besides, although the lamp harness 15 is connected to the FPC 13 by the insertion of the convex-form connector 22 into the concave-form connector 23 at the connector unit 14 in the present embodiment, the present invention is not limited thereto. For example, as shown in FIG. 6, the lamp harness 15 may be connected to the FPC 13 directly by soldering, with only the reinforcing plate 25 including the harness guide 26 therebetween. This miniaturizes the connection part at which the lamp harness 15 is connected to the FPC 13.

Further, in the present embodiment, the convex-form connector 22 is provided at the end of the lamp harness 15, and the concave-form connector 23 is provided at the end of the FPC 13; however, the present invention is not limited thereto. A concave-form connector may be provided at the end of the lamp harness 15, and a convex-form connector may be provided at the end of the FPC 13.

Next, a description will be given, with reference to FIG. 7 and FIG. 8, of a second embodiment according to the present invention. Elements in the present second embodiment that are identical or equivalent to the elements described in the foregoing first embodiment are referenced by the same reference marks, and will not be described in detail. The same applies to the herein-later described embodiments.

Figure 7:
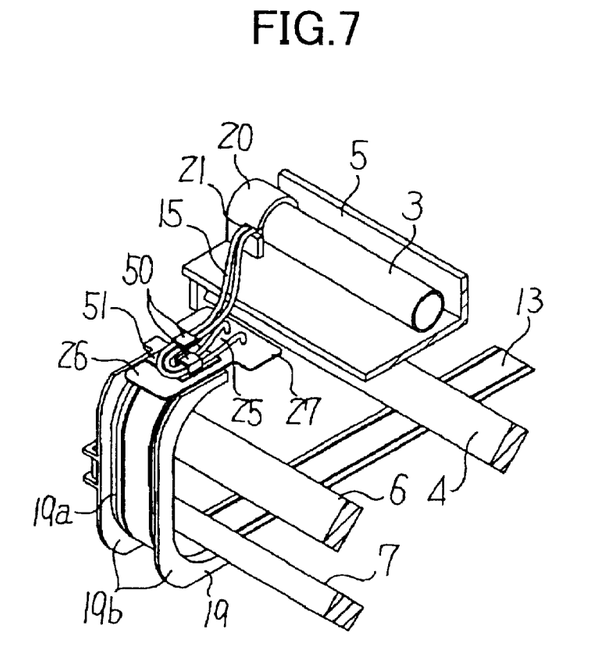
FIG. 7 is a magnified perspective view in the vicinity of the first traveler according to a second embodiment of the present invention.
Figure 8:
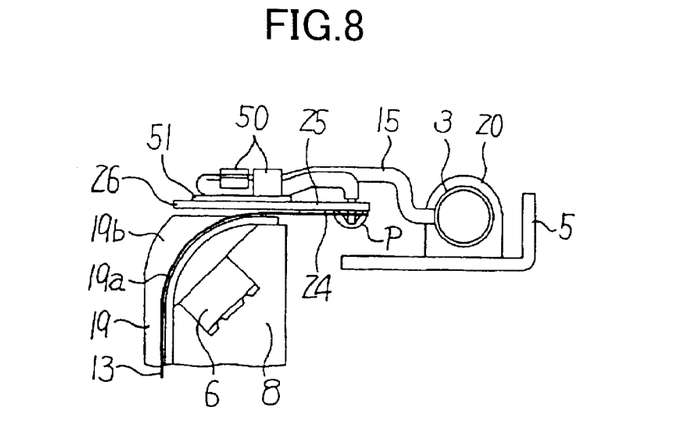
FIG. 8 is a vertical-sectional side view in the vicinity of the first traveler shown in FIG. 7.

FIG. 7 is a magnified perspective view in the vicinity of the first traveler 5 according to the present second embodiment. FIG. 8 is a vertical-sectional side view thereof. In the present embodiment, a harness restriction unit 51 is provided on an upper surface of the harness guide 26. A pair of restricting hooks 50 bending inward respectively are formed as restricting members on the harness restriction unit 51. The lamp harness 15 is fixed at a position on the harness guide 26 by an extra-length portion thereof being restricted by the harness restriction unit 51.

Thereby, at least a part of the lamp harness 15 is fixed to the harness guide 26 so that the lamp harness 15 is positioned at a periphery of the harness guide 26. Accordingly, the lamp harness 15 can be prevented from departing from the harness guide 26 into a friction against neighboring elements; thus, the lamp harness 15 can be prevented from being damaged.

Especially, in the present embodiment, the restricting members 50 of the harness restriction unit 51 are provided on the harness guide 26 opposite the FPC 13, and the lamp harness 15 is restricted to the harness guide 26 by the restricting members 50. Thus, the lamp harness 15 is positioned opposite the FPC 13 with the harness guide 26 therebetween.

Accordingly, the above-described simple structure can surely prevent the lamp harness 15 and the FPC 13 from contacting each other.

Additionally, in the course of the first traveler 5 and the second traveler 8 traveling back and forth, the lamp harness 15 can be surely prevented from jouncing on the harness guide 26. Thus, even when the first traveler 5 and the second traveler 8 travel back and forth, the lamp harness 15 can be positioned constantly on the harness guide 26.

Besides, although the harness restriction unit 51 having the restricting hooks 50 is provided on the upper surface of the harness guide 26 in the present embodiment, the present invention is not limited thereto. For example, the restricting hooks 50 may be provided directly on the upper surface of the harness guide 26.

Further, the lamp harness 15 may be fixed directly on the upper surface of the harness guide 26 by using an adhesive and so forth. Accordingly, the number of elements composing the image scanner 1 is reduced so that the image scanner 1 can be assembled more easily.

Next, a description will be given, with reference to FIG. 9, of a third embodiment according to the present invention. The present embodiment is an example of applying the present invention to a copying machine.

Figure 9:
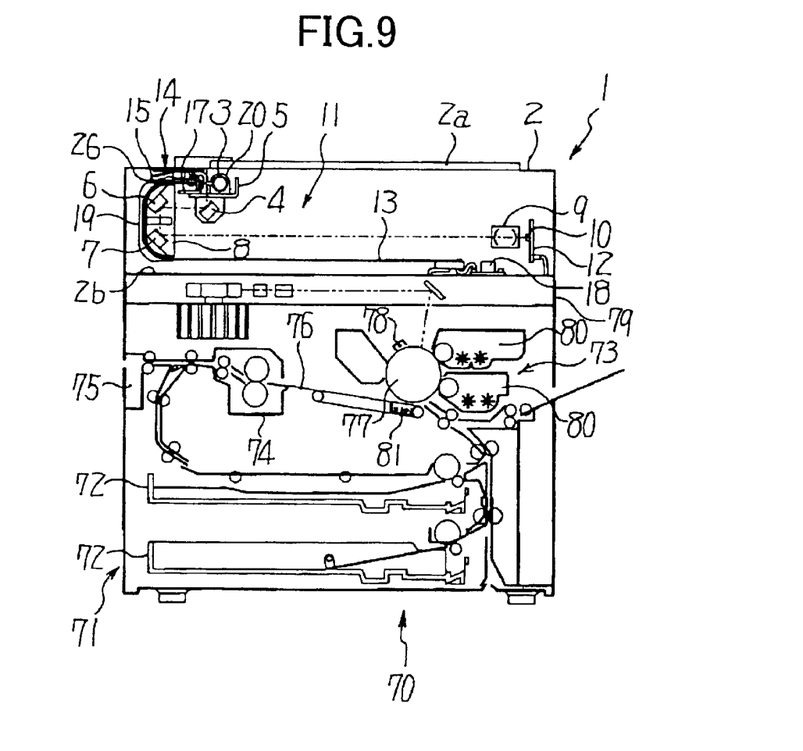
FIG. 9 is a vertical-sectional side view of a copying machine according to a third embodiment of the present invention.

FIG. 9 is a vertical-sectional side view of a copying machine 70 according to the present third embodiment. As shown in FIG. 9, the copying machine 70 comprises the image scanner 1 described in the foregoing embodiments, and a printer device 71 as an image-forming device provided under the image scanner 1.

In the printer device 71 is formed a sheet conveyance path 76. The sheet conveyance path 76 starts from a feeding tray 72 on which sheets are stacked, via a printer unit 73 adopting an electrophotographic method, via a fixing unit 74, and to a delivery stacker 75. A photosensitive member 77 is provided at a substantially central part of the printer unit 73. Around the photosensitive member 77 are arranged an electrifying unit 78, an exposing unit 79, a developing unit 80, a transferring unit 81, and other components. The electrifying unit 78 electrifies a surface of the photosensitive member 77 uniformly. The exposing unit 79 exposes an image of a subject copy read by the image scanner 1 so as to form a latent image on the surface of the photosensitive member 77. The developing unit 80 develops the latent image by applying toners thereto. The transferring unit 81 transfers the developed image to a sheet conveyed along the sheet conveyance path 76.

In the copying machine 70 structured as above, the image of the subject copy read by the image scanner 1 is formed by the printer unit 73 on the sheet conveyed along the sheet conveyance path 76 according to a synchronized timing, and then is fixed by the fixing unit 74.

In the present embodiment, the copying machine 70 uses the miniaturized image scanner 1 so as to function highly conveniently for a user.

Besides, although the printer unit 73 adopts an electrophotographic method in the present embodiment, the present invention is not limited thereto. For example, the present invention may be applied to an inkjet printer using jets of ink.

The present invention is not limited to the specifically disclosed embodiments, and variations and modifications may be made without departing from the scope of the present invention.

The present application is based on Japanese priority application No. 2001-198053 filed on Jun. 29, 2001, the entire contents of which are hereby incorporated by reference.

What is claimed is:

1. An image-reading device exposing and scanning an image of a subject copy by reciprocating a first traveler including an exposure lamp and a mirror, and a second traveler including two mirrors, along a sub scanning direction at a velocity ratio of 2:1, the image-reading device comprising:

a harness supplying power to said exposure lamp;

a flexible cable having one end connected to said harness and the other end connected to a power source; and a contact prevention member provided on said first traveler so as to prevent said harness from contacting said second traveler and said mirrors included in said second traveler.

2. The image-reading device as claimed in claim 1, further comprising a cable guide provided on said second traveler so as to guide said flexible cable to a side toward which said second traveler travels back, wherein said contact prevention member prevents said harness from contacting said cable guide.

3. The image-reading device as claimed in claim 2, further comprising a plate-form reinforcing member bonded to said flexible cable so that said harness and said flexible cable are connected to each other with said reinforcing member therebetween, wherein said contact prevention member is a plate-form member formed unitarily with said reinforcing member.

4. The image-reading device as claimed in claim 2, further comprising:
   a first connector provided at an end of said harness; and
   a second connector provided at said one end of said flexible cable so that said first connector is detachably inserted into said second connector,
   wherein said first connector can be inserted into and detached from said second connector at a side of said second connector opposite said one end of said flexible cable.

5. The image-reading device as claimed in claim 2, wherein at least a part of said harness is fixed to said contact prevention method.

6. The image-reading device as claimed in claim 5, further comprising a restricting member provided on a surface of said contact prevention member opposite said flexible cable so as to restrict said harness on said surface of said contact prevention member.

7. The image-reading device as claimed in claim 1, further comprising a plate-form reinforcing member bonded to said flexible cable so that said harness and said flexible cable are connected to each other with said reinforcing member therebetween,
   wherein said contact prevention member is a plate-form member formed unitarily with said reinforcing member.

8. The image-reading device as claimed in claim 1, further comprising:
   a first connector provided at an end of said harness; and
   a second connector provided at said one end of said flexible cable so that said first connector is detachably inserted into said second connector,
   wherein said first connector can be inserted into and detached from said second connector at a side of said second connector opposite said one end of said flexible cable.

9. The image-reading device as claimed in claim 1, wherein at least a part of said harness is fixed to said contact prevention member.

10. The image-reading device as claimed in claim 9, further comprising a restricting member provided on a surface of said contact prevention member opposite said flexible cable so as to restrict said harness on said surface of said contact prevention member.

11. A copying machine comprising:
    an image-reading device exposing and scanning an image of a subject copy by reciprocating a first traveler including an exposure lamp and a mirror and a second traveler including two mirrors along a sub scanning direction at a velocity ratio of 2:1 so as to read said image of said subject copy, the image-reading device including a harness supplying power to said exposure lamp, a flexible cable having one end connected to said harness and the other end connected to a power source, and a contact prevention member provided on said first traveler so as to prevent said harness from contacting said second traveler and said mirrors included in said second traveler; and
    an image-forming device forming said image of said subject copy read by said image-reading device on a sheet.

12. The copying machine as claimed in claim 11, wherein said image-reading device further includes a cable guide provided on said second traveler so as to guide said flexible cable to a side toward which said second traveler travels back,
    wherein said contact prevention member prevents said harness from contacting said cable guide.

13. An image-reading device exposing and scanning an image of a subject copy by reciprocating a first traveler including an exposed lamp and a mirror, and a second traveler including mirrors, along a sub scanning direction at a velocity ratio of 2:1, the image-reading device comprising:
    harness means for supplying power to said exposure lamp;
    flexible cable means having one end connected to said harness means and the other end connected to a power source; and
    contact prevention means provided on said first traveler for preventing said harness means from contacting said second traveler and said mirrors included in said second traveler.

14. A copy machine comprising:
    an image-reading device exposing and scanning an image of a subject copy by reciprocating a first traveler including an exposure lamp and a mirror, and a second traveler including mirrors, along a sub scanning direction at a velocity ratio of 2:1, the image-reading device including:
    harness means for supplying power to said exposure lamp,
    flexible cable means having one end connected to said harness means and the other end connected to a power source, and
    contact prevention means provided on said first traveler for preventing said harness means from contacting said second traveler and said mirrors included in said second traveler; and
    an image-forming device forming said image of said subject copy read by said image-reading device on a sheet.

* * * * *